United States Patent
Ahn et al.

(10) Patent No.: US 7,343,176 B2
(45) Date of Patent: Mar. 11, 2008

(54) NODE B SCHEDULING METHOD FOR MOBILE COMMUNICATION SYSTEM

(75) Inventors: Joon-Kui Ahn, Seoul (KR); Hak-Seong Kim, Seoul (KR); Seung-Hwan Won, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 15 days.

(21) Appl. No.: 10/921,361

(22) Filed: Aug. 19, 2004

(65) Prior Publication Data
US 2005/0043062 A1 Feb. 24, 2005

(30) Foreign Application Priority Data

Aug. 19, 2003 (KR) ........................ 10-2003-057335
Oct. 4, 2003 (KR) ........................ 10-2003-069040

(51) Int. Cl.
*H04B 7/00* (2006.01)
(52) U.S. Cl. .................. 455/560; 455/422.1; 455/423
(58) Field of Classification Search ............. 455/422.1, 455/423, 224
See application file for complete search history.

(56) References Cited

U.S. PATENT DOCUMENTS

| | | | |
|---|---|---|---|
| 5,923,650 A | 7/1999 | Chen et al. ................. | 370/331 |
| 6,597,705 B1 | 7/2003 | Rezaiifar et al. ........... | 370/468 |
| 2001/0053670 A1 | 12/2001 | Voyer ........................... | 455/69 |
| 2004/0109424 A1 | 6/2004 | Chheda ....................... | 370/331 |
| 2004/0224677 A1* | 11/2004 | Kuchibhotla et al. .... | 455/422.1 |

OTHER PUBLICATIONS

Search Report and Written Opinion of International Search Authority dated Nov. 25, 2004.

* cited by examiner

*Primary Examiner*—Joseph Feild
*Assistant Examiner*—Phuoc Doan
(74) *Attorney, Agent, or Firm*—Ked & Associates, LLP

(57) ABSTRACT

A method of uplink transmission scheduling for a network including at least one radio network controller (RNC), at least one user equipment (UE), and a plurality of Node Bs, with the steps of determining a parameter to be used in uplink transmission scheduling by considering uplink noise rise of the plurality of Node Bs, and performing the uplink transmission scheduling in accordance with the determined parameter. By determining the parameter upon considering the effects of the transmit power or transmit rate for a particular UE in soft handover with a scheduling Node B on the uplink noise rise of other neighboring Node Bs that are in soft handover but not scheduled with that particular UE, uplink transmission scheduling performance degradation can be prevented and more effective control of uplink noise rise at each Node B is possible.

18 Claims, 6 Drawing Sheets

■: UEs in SHO, scheduled by NodeB1
▨: UEs in SHO, scheduled by NodeB2

NODE B SCHEDULING METHOD FOR MOBILE COMMUNICATION SYSTEM

CROSS-REFERENCE TO RELATED APPLICATIONS

The present application claims priority to Korean Patent Application No. P03-057335, filed on Aug. 19, 2003, and P03-069040, filed on Oct. 4, 2003, the entire contents of both which are hereby incorporated in their entirety. This application is related to U.S. application Ser. No. 10/845,087, filed on May 14, 2004, Ser. No. 10/936,965, filed on Sep. 14, 2004, Ser. No. 10/939,971, filed on Sep. 14, 2004, and Ser. No. 10/933,458, filed on Sep. 3, 2004 all of which are also hereby incorporated in their entirety.

BACKGROUND OF THE INVENTION

1. Field of the Invention

The present invention relates to a wireless mobile communication system, and more particularly to a Node B scheduling method applicable to an uplink channel that reduces a variation of uplink interference in the wireless communication system.

2. Background of the Related Art

In radio (wireless) mobile communication systems, the concept of an enhanced uplink dedicated channel (E-DCH) is being discussed to address the demand for a high-speed uplink. As known, a wireless communication network typically includes a plurality of mobile stations (MS), a plurality of base stations (BS), a base station controller (BSC), a mobile switching center (SC), a packet data serving node (PDSN) or interworking function (IWF), a public switched telephone network (PSTN), and an Internet protocol (IP) network.

See, for example, JUHUA KORHONEN, INTRODUCTION TO 3G MOBILE COMMUNICATIONS SYSTEMS ($2^{nd}$ ed. 2003), the entire contents of which are hereby incorporated by reference in its entirety. In the above-described telecommunication system, a base station is referred to as a Node B, and a mobile terminal, subscriber unit, etc. is referred to as a User Equipment (UE). Further, a Node B (base station) that is in control of UEs is referred to as a scheduling Node B.

In a UMTS (Universal Mobile Telecommunication System), user equipment (UE) is equivalent to the mobile station, a Node B is equivalent to the base station, and a radio network controller (RNC) is equivalent to the base station controller. In the present application, the relationship between the UE, the Node Bs, and the RNC will be discussed.

In one example, the related art uplink scheduling and transmit rate control is performed by a scheduler in the radio network controller (RNC). The UEs then transmit data within an allowable transmission rate/power determined by the RNC. A Node B rather than the RNC may also perform uplink scheduling of transmission rate/power for quick adjustment of the uplink load change, but there are still disadvantages with the Node B scheduling as well.

SUMMARY OF THE INVENTION

An object of the invention is to solve at least the above problems and/or disadvantages and to provide at least the advantages described hereinafter.

Another object of the present invention is to provide a novel Node B scheduling method that controls the uplink load amount during a soft handover.

To achieve the above and other objectives, the present invention provides a novel method of uplink transmission scheduling for a network including at least one radio network controller (RNC), at least one user equipment (UE), and a plurality of Node Bs, with the at least one UE being in soft handover with at least two Node Bs. The method includes determining a parameter to be applied to an uplink transmission schedule of the at least one UE based on an interference effect caused to neighboring Node Bs not scheduling the at least one UE.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements wherein.

BEST MODE OF THE INVENTION

Figure 1:
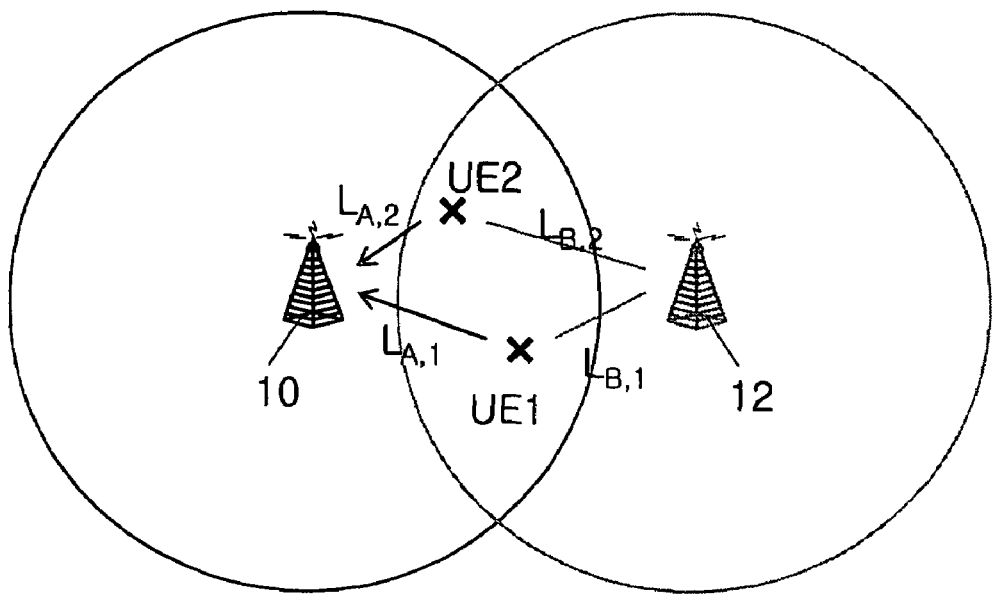
FIG. 1 is a diagram showing an example of how a credit value for UEs in soft handover with two Node Bs is determined according to the present invention.

Referring now to the drawings, wherein like reference numerals designate identical or corresponding parts throughout the several view, the present invention will be described.

In contrast to the related art RNC uplink scheduling method, scheduling via Node Bs allows the ability to control uplink load amounts by adjusting the transmit power/rate of the user equipment (UE). As a result, the Node B scheduler can operate such that the noise rise margin of the scheduling Node B is relatively small by minimizing the changes in the uplink load amount. This results in an increase of cell capacity and cell coverage expansion.

Note the noise rise margin is defined as follows. Each Node B has a noise rise limitation. The noise rise is defined as the total noise received divided by the thermal noise. The noise rise margin is defined as the margin between the noise rise limitation and the average noise rise. A smaller noise rise margin allows the communication system to provide a larger capacity, for example.

Although the Node B scheduling method allows the ability to control the uplink load amount for the scheduling Node B, the present inventors determined that Node B scheduling causes interference for neighboring Node Bs (e.g., an increase in the noise rise for the neighboring Node Bs). That is, the scheduling Node B is not aware of noise rise conditions of neighboring Node Bs, because this information is not shared between various Node Bs. In particular, a scheduling Node B in a handover situation sends scheduling commands to the UE based only on its own noise rise conditions, and does not consider the noise rise conditions of neighboring Node Bs. Thus, the noise rise margins for neighboring Node Bs are disadvantageously affected.

FIRST EXAMPLE

Credit Values

The first example of the present invention illustrates a scheduling request from a particular Node B in which credit values (or "credits") are used in the scheduling request. Namely, in this example, the UE is in soft handover with a plurality of Node Bs, but only receives scheduling commands from one Node B. In this instance, the radio network controller (RNC), which controls one or more Node Bs, determines the credit values to be assigned each UE to reduce a variation in uplink interference so as to increase the system capacity.

In one example, the RNC determines that because the transmit power (or transmit rate) of a particular UE in soft handover causes more uplink interference to other neighboring Node Bs in soft handover that are not scheduling the particular UE, a smaller credit value is applied to the particular UE, and vice versa. That is, a smaller credit value is assigned to the UE in soft handover, to reduce the transmit power or transmit rate, for example, which thus reduces the interference of the neighboring Node Bs.

In addition, the scheduling Node B uses the credit values received from the RNC to an allowable transmission power/rate for the UEs under its control. Note that according to the present invention, a priority/probability scheme may also be applied to UEs in soft handover. That is, the RNC may determine different probabilities/priorities that the UEs in SHO may transmit and then send this information to the scheduling Node B or the UEs in SHO. For example, a UE in SHO that is causing a larger uplink interface to neighboring Node Bs may be assigned a lower transmission priority/probability and vice versa.

By doing so, the effects of noise rise from the scheduled UEs are averaged such that the uplink noise rise of all Node Bs can be more efficiently controlled, thereby increasing the overall system capacity.

As one example of determining the credit values for UEs in soft handover with a plurality of Node Bs, the RNC uses a ratio formed by the path-loss of the UEs to the scheduling Node B and the path-loss of the UEs to the other non-scheduling Node Bs that it is in soft handover with. The path-gain rather than the path-loss may also be used. Also, without being limited to this example, the credit value can be determined by considering the terrestrial relationship of the UE in soft handover with the Node Bs. That is, the weather conditions, or other excessive interference conditions, etc. can be considered when determining the credit values so as to reduce a variation of uplink interference in the communication system.

Turning now to FIG. 1, which is a drawing illustrating one example of determining credit values of UEs in soft handover with two Node Bs. In this example, UE1 and UE2 are both assumed to be in soft handover (SHO) with the two Node Bs (10, 12), but receive scheduling commands from only one Node B, namely, Node B (10), as indicated by the arrows from UE1 and UE2 to Node B (10).

Here, FIG. 1 shows an example where UE1 is relatively closer in distance to Node B (12) compared to UE2, while UE2 is relatively closer in distance to Node B (10) compared to UE1. In this example, it is assumed a shorter distance to the Node B results in less path-loss than a longer distance, however, it is possible that a UE at a further distance has less path-loss than a UE at a close distance to the Node B. That is, the arrows in FIG. 1 represent an amount of a path-loss or path-gain, rather than a distance. A distance however may also be used according to the present invention.

As shown in FIG. 1, for Node B (10), UE2 has a lower path-loss relative to UE1, and for Node B (12), UE1 has a lower path-loss relative to UE2. Further, if the path-loss of the UE1 with respect to Node B (10) and Node B (12) is $L_{A,1}$ and $L_{B,1}$, respectively, and if the path-loss of the UE2 with respect to Node B (10) and Node B (12) is $L_{A,2}$ and $L_{B,2}$, respectively, then the credit values $W_1$ and $W_2$ with respect to UE1 and UE2, respectively, can be defined by the following equations:

$$W_1 = \frac{1/L_{A,1}}{1/L_{A,1} + 1/L_{B,1}}, W_2 = \frac{1/L_{A,2}}{1/L_{A,2} + 1/L_{B,2}}.$$

As UE1 and UE2 receive scheduling commands from only Node B (10), according to the above equations, a smaller credit value is assigned to UE1 that has a relatively small path-loss ($L_{B,1}$) with respect to the Node B (12) compared to UE2 that has a relatively large path-loss ($L_{B,2}$) with respect to Node B (12). As a result, the plurality of UEs (UE1 and UE2) being scheduled by Node B (10) have a smaller effect on Node B (12) such that unstable changes in the noise rise of Node B (12) caused by UE1 and UE2 is prevented. That is, the negative effect caused by the interference to the non-scheduling Node B (12) are reduced. Note, if the negative effects are not reduced, the interference caused to Node B (12) may be sufficient to prevent other UEs from communicating with the non-scheduling Node B (12), and/or the soft handovers occurring with the non-scheduling Node B (12) may be disrupted. Further, reducing interference caused to neighboring Node Bs, allows the neighboring Node Bs to offer a larger capacity to other UEs operating in the neighboring Node Bs cells.

As noted above, the gain-paths may also be used. In this instance, the above equations would be:

$$W_1 = \frac{G_{A,1}}{G_{A,1} + G_{B,1}} \quad W_2 = \frac{G_{A,2}}{G_{A,2} + G_{B,2}}$$

Hereinafter, the path-loss is used, but it is to be noted the path-gain may also be used.

Figure 2:
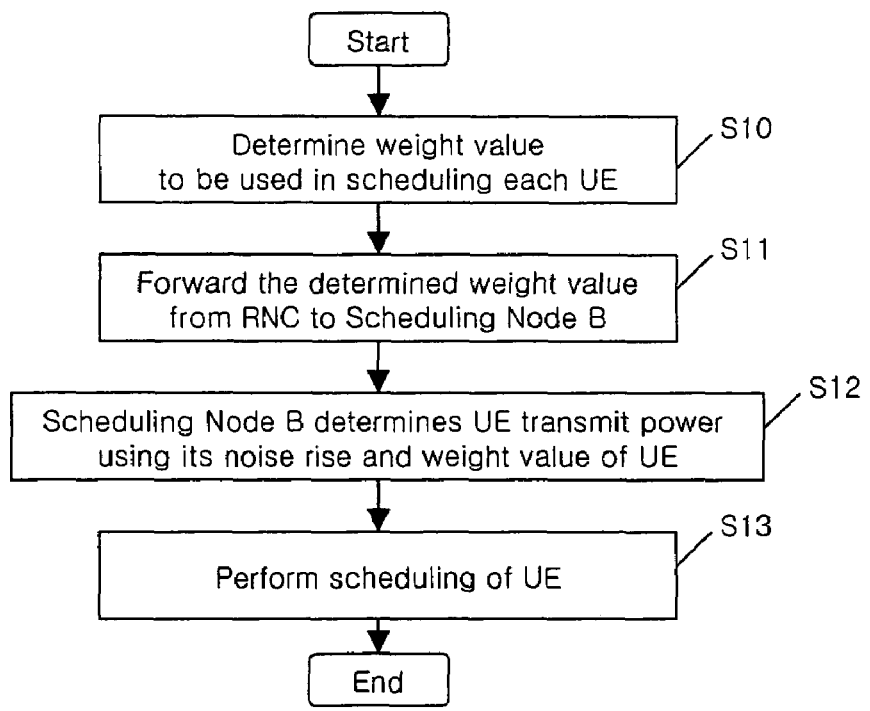
FIG. 2 is a flow chart showing a Node B scheduling method according to a first example of the present invention.

Next, the Node B scheduling method according to the first example of the present invention will be explained in more detail by referring to FIG. 2. FIG. 2 shows the situation where a certain UE is in soft handover with a plurality of Node Bs, and only one Node B performs scheduling for the UE.

First, in step S10, the RNC determines an appropriate credit value for each UE in soft handover based upon the information related to the uplink of the scheduling Node B and the other Node Bs in soft handover, and in step S11, these credit values are transmitted to the scheduling Node B. Note, the credit value may be changed by the RNC whenever a change in credit value is required or requested.

Next, in step S12, the scheduling Node B analyzes its own noise rise, calculates its currently allowed noise rise amount, and then based upon this amount, determines the transmit power (or transmit rate) of the UEs that it has to schedule. Here, the scheduling Node B applies the above-described credit values in determining the final transmit power (or transmit rate) for those UEs in soft handover.

Finally, in step S13, the Node B informs each UE of the determined allowable transmit power (or transmit rate) through scheduling commands. The Node B can also perform scheduling by increasing or decreasing the current transmit power (or transmit rate) of the UE based upon the determined allowable transmit power (or transmit rate).

SECOND EXAMPLE

Limit Values

The second example is similar to the first example except the UE is in soft handover with a plurality of Node Bs, and a limit value is imposed on the transmit power/rate to each UE.

Figure 3:
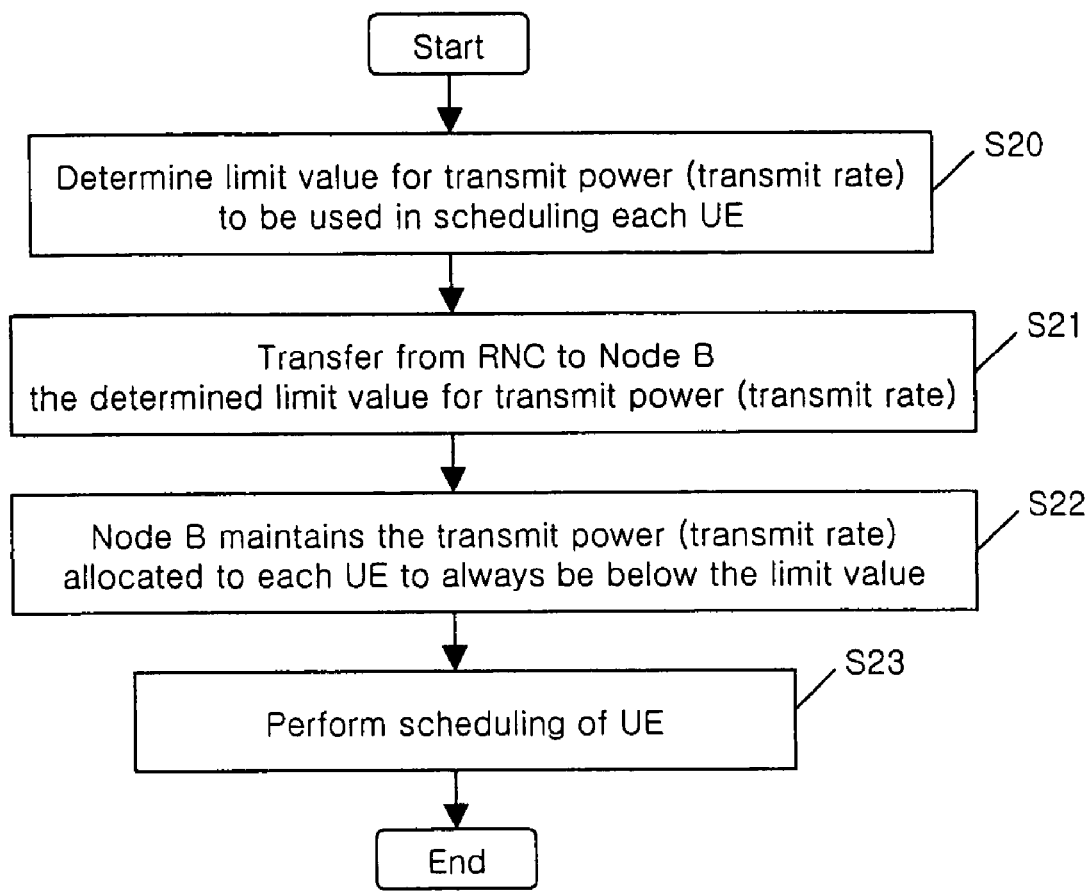
FIG. 3 is a flow chart showing a Node B scheduling method according to a second example of the present invention.

As shown in FIG. 3, in step S20, the RNC determines a limit value of the transmit power (or transmit rate) applied to the scheduling of each UE among all the UEs that are in soft handover with a plurality of Node Bs, and in step S21, informs the limit value of each UE to the scheduling Node B.

Thus, in steps S22 and S23, the Node B performs scheduling for each UE such that the transmit power (or transmit rate) allocated to each UE in soft handover will always be maintained below the limit value.

As in the first example, the RNC determines that because the transmit power (or transmit rate) of a particular UE in soft handover causes more interference to other non-scheduling neighboring Node Bs, a smaller limit value is applied to the particular UE, and vice versa. Also, the limit value can be determined by considering the terrestrial relationship between the Node Bs and the UE in soft handover.

In this way, by minimizing the effects due to the scheduling of each Node B on the noise rise of neighboring Node Bs the variation in uplink noise rise of all Node Bs can be better controlled.

THIRD EXAMPLE

Selection Probability

In the third example, the UE (rather than the Node B) determines its subsequent operation by appropriately combining scheduling requests from several Node Bs. Namely, unlike the first and second examples, the third example is applied when the UE is in soft handover with a plurality of Node Bs, and receives scheduling from all of the Node Bs. Here, all Node Bs with which a certain UE is in soft handover with, send scheduling commands to that UE and the selection of the final transmit power or transmit rate is performed by the UE.

Further, the RNC determines a selection probability of the UE with respect to each Node B in soft handover and informs this value to the UE. The selection probability refers to each Node B having a certain probability of being selected by the UE for performing scheduling.

In addition, each Node B in soft handover with the UE transmits scheduling commands to the UE according to their uplink noise rise conditions. The UE receives the scheduling commands by the Node Bs in soft handover thereto, and selects one of the scheduling commands applying the selection probability of each Node B provided from the RNC.

By doing so, the effects due to the scheduling of each Node B on the noise rise of neighboring Node Bs are averaged, and thus the control of uplink noise rise of all the Node Bs can be more effectively performed.

Figure 4:
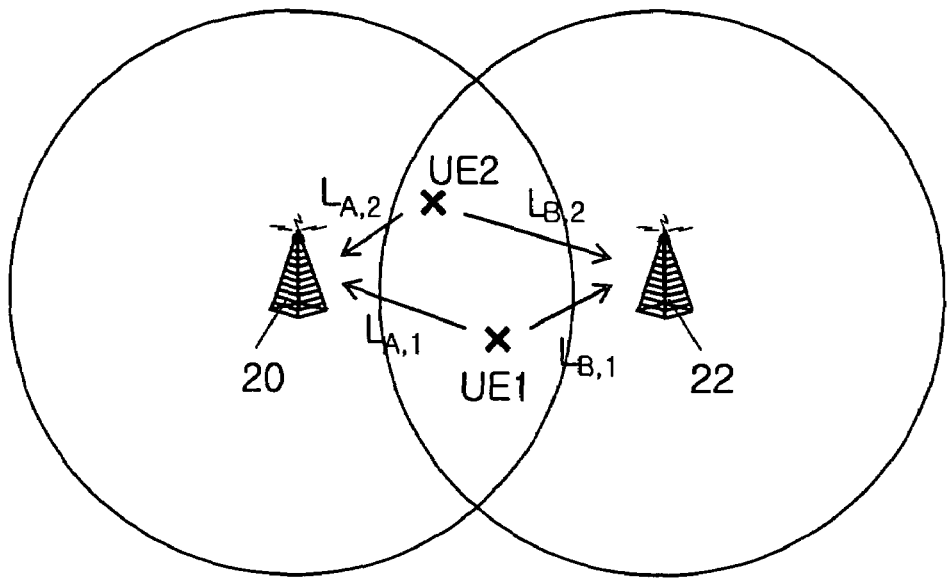
FIG. 4 is a diagram showing an example of a UE in soft handover with a plurality of Node Bs and the determination of a selection probability for each Node B according to the present invention.

FIG. 4 is a drawing showing an example of how the UE determines the selection probability with respect to each Node B in soft handover thereto. Note, it is assumed both UE1 and UE2 are in soft handover with the two Node Bs (20 and 22), and that scheduling commands are received from both Node Bs (20 and 22), as indicated by the arrows from UE1 and UE2 to both Node Bs (20 and 22).

Also, if the path-loss for UE1 with respect to the Node Bs (20 and 22) are $L_{A,1}$, $L_{B,1}$, respectively, and the path-loss for UE2 with respect to the Node Bs (20 and 22) are $L_{A,2}$, $L_{B,2}$, respectively, the selection probabilities ($P_{A,1}$, $P_{B,1}$) of UE1 with respect to the Node Bs (20 and 22), and the selection probabilities ($P_{A,2}$, $P_{B,2}$) of UE2 with respect to the Node Bs (20 and 22) can be defined as follows:

$$P_{A,1} = \frac{1/L_{A,1}}{1/L_{A,1} + 1/L_{B,1}}, \quad P_{B,1} = \frac{1/L_{B,1}}{1/L_{A,1} + 1/L_{B,1}}$$

$$P_{A,2} = \frac{1/L_{A,2}}{1/L_{A,2} + 1/L_{B,2}}, \quad P_{B,2} = \frac{1/L_{B,2}}{1/L_{A,2} + 1/L_{B,2}}$$

Here, FIG. 4 shows an example where UE1 is relatively closer in distance to Node B (22) compared to UE2, while UE1 is relatively closer in distance to Node B (20) compared to UE2. Namely, for Node B (20), UE2 has a lower path-loss relative to UE1, and for Node B (22), UE1 has a lower path-loss relative to that of UE2. The path-gain values may also be used.

As such, the UE1 having a relatively smaller path-loss with respect to Node B (22) has a greater probability of obeying a scheduling command from Node B (22), while the UE2 having a relatively smaller path-loss with respect to Node B (20) has a greater probability of obeying a scheduling command from Node B (20). In this way, the interference effects from scheduling other Node Bs is reduced and averaged for each Node B, thus preventing large variations in the noise rise of each Node B.

Figure 5:
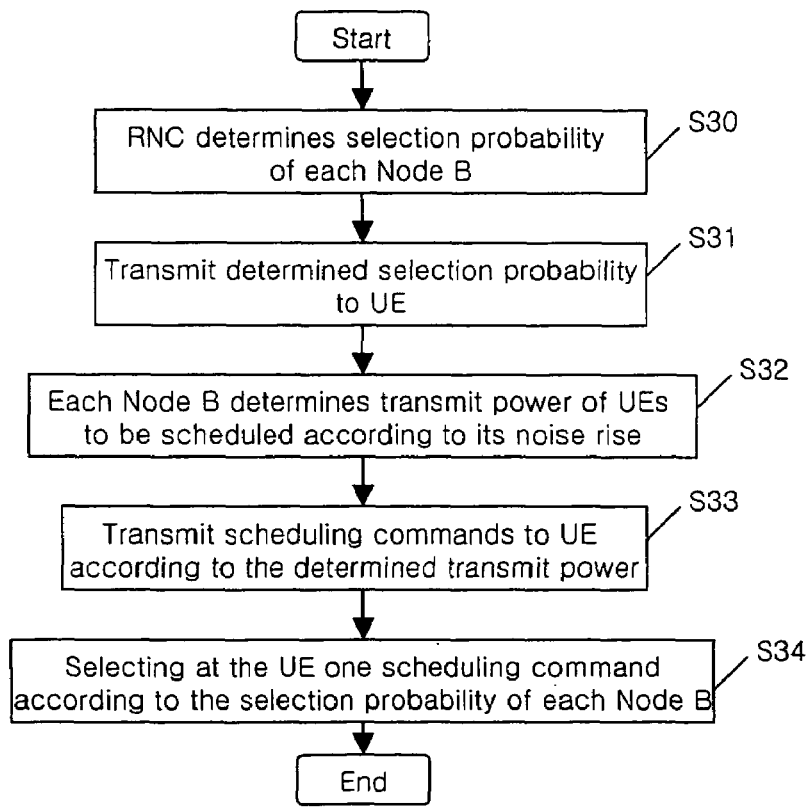
FIG. 5 is a flow chart showing a Node B scheduling method according to a third example of the present invention.

Now, the Node B scheduling method according to the third example of the present invention will be explained in more detail with reference to FIG. 5. FIG. 5 shows when a particular UE is in soft handover with a plurality of Node Bs and all of the Node Bs perform scheduling on that UE.

First, in step S30, the RNC determines for each UE an appropriate selection probability regarding each Node B based upon the information related to the uplink of the Node Bs in soft handover with the particular UE, and informs the UE. Note, the selection probability can be changed by the RNC whenever a selection probability change is required.

In steps S32 and S33, each Node B in soft handover with a particular UE analyzes its own noise rise, calculates its currently allowed noise rise amount, determines (based upon the calculated amount) the transmit power (or transmit rate) of the UEs that it must schedule, and then performs scheduling. Namely, the Node Bs in soft handover with the UE can, for example, include the determined transmit power (or transmit rate) with the scheduling commands and transmit these values to the UE.

In step S34, the UE receives scheduling commands from all of the Node Bs that it is in soft handover with. The UE applies the selection probabilities regarding each Node B that have been previously provided from the RNC, such that one of the scheduling commands among the plurality of scheduling commands that were received is selected and performed.

As described above, by applying the present invention to the uplink Node B scheduling of UEs in soft handover with a plurality of Node Bs, uplink scheduling performance degradation due to disparities of scheduling between various Node Bs can be prevented, and more effective control of the uplink noise rise at each Node B is possible.

Although the above-described first, second, and third examples relate to one UE in soft handover with two Node Bs, a UE may be in soft handover with more than two Node Bs. Examples of such situations are shown in FIGS. 6 and 7.

Figure 6:
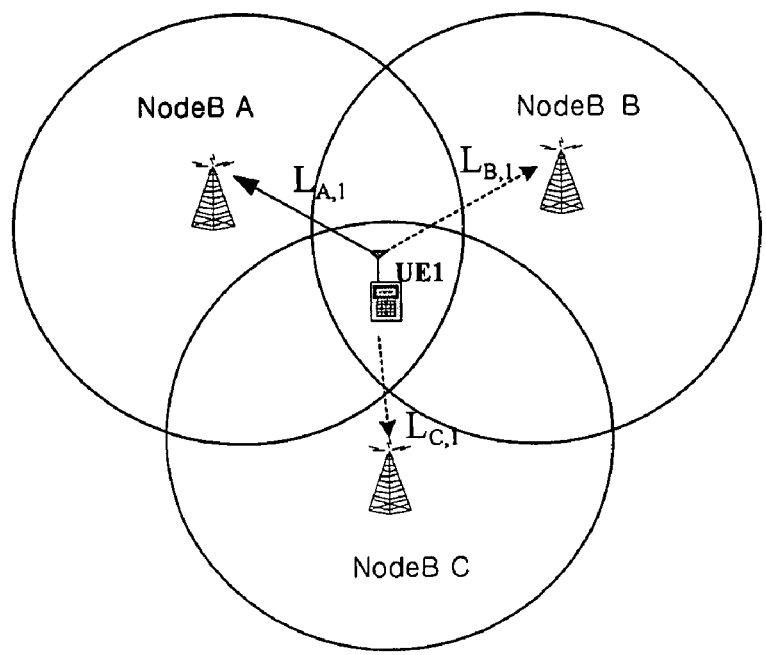
FIG. 6 is a diagram showing that one UE may be in soft handover with more than two Node Bs, and receive scheduling from only one Node B.
Figure 7:
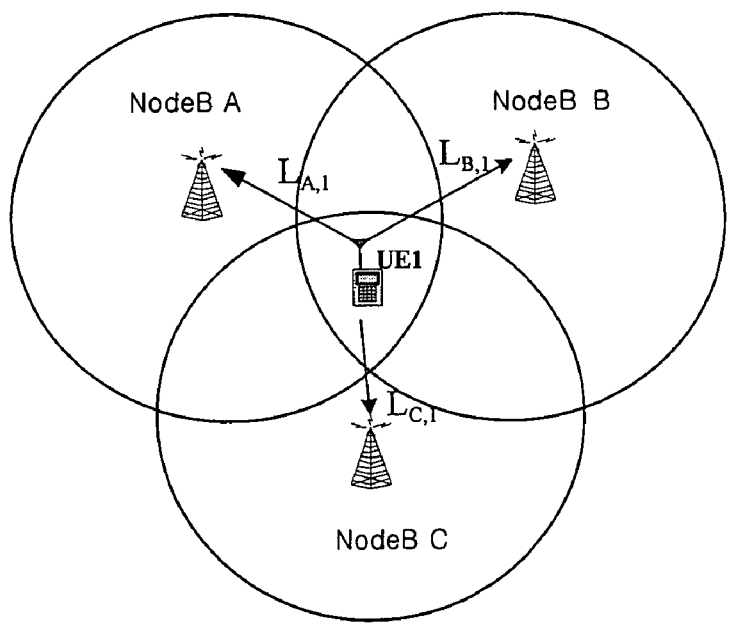
FIG. 7 is a diagram showing that one UE may be in soft handover with more than two Node Bs, and receive scheduling from all Node Bs.

FIG. 6 shows one UE (UE1) in soft handover with three Node Bs (Node B A, NodeB B, and NodeB C), and receiving scheduling from only one Node B, namely, Node B A, as indicated by the solid arrow from UE1 to Node B A.

According to a first method for obtaining credit values when UE1 is in soft handover with more than two Node Bs, the following equations can be used. Although not depicted for the sake of clarity, it is assumed that a second UE (UE2), similar to FIG. 1, is also in soft handover with the three Node Bs, but receives scheduling only from the single Node B Node B A), which can be referred to as the scheduling (or serving) Node B. The RNC calculates the credit values.

In a 3-way handover situation among three Node Bs, for the scheduling Node B NodeB A), the credit values for UE1 and for UE2, respectively, are:

$$W_1^A = \frac{1/L_{A,1}}{1/L_{A,1} + 1/L_{B,1} + 1/L_{C,1}}$$

$$W_2^A = \frac{1/L_{A,2}}{1/L_{A,2} + 1/L_{B,2} + 1/L_{C,2}}$$

In an N-way handover situation among an N number of Node Bs, for the scheduling Node B (Node B 1), the credit values for UE1 and for UE2, respectively, are:

$$W_1^1 = \frac{1/L_{1,1}}{(1/L_{1,1} + 1/L_{2,1} + 1/L_{3,1} + \ldots + 1/L_{N,1})}$$

$$W_2^1 = \frac{1/L_{1,2}}{(1/L_{1,2} + 1/L_{2,2} + 1/L_{3,2} + \ldots + 1/L_{N,2})}$$

According to a second method for obtaining credit values when UE1 is in soft handover with more than two Node Bs, the following equations can be used.

In a 3-way handover situation among three Node Bs, for the scheduling Node B (NodeB A), the credit values for UE1 are:

$$\mathrm{MIN}(W_{B,1}^A, W_{C,1}^A) \text{ or } \mathrm{MAX}(W_{B,1}^A, W_{C,1}^A)$$

where $W_{B,1}^A = \dfrac{1/L_{A,1}}{1/L_{A,1} + 1/L_{B,1}}$, $W_{C,1}^A = \dfrac{1/L_{A,1}}{1/L_{A,1} + 1/L_{C,1}}$ In an N-way handover situation among an N number of Node Bs, for the scheduling Node B (NodeB 1), the credit values for UE1 are:

$$\mathrm{MIN}(W_{2,1}^1, W_{3,1}^1, W_{4,1}^1, \ldots, W_{N,1}^1) \text{ or } \mathrm{MAX}(W_{2,1}^1, W_{3,1}^1, W_{4,1}^1, \ldots, W_{N,1}^1)$$

where $$W_{2,1}^1 = \frac{1/L_{1,1}}{1/L_{1,1} + 1/L_{2,1}}, \ W_{3,1}^1 = \frac{1/L_{1,1}}{1/L_{1,1} + 1/L_{3,1}},$$

$$W_{4,1}^1 = \frac{1/L_{1,1}}{1/L_{1,1} + 1/L_{4,1}} \ldots, \ W_{N,1}^1 = \frac{1/L_{1,1}}{1/L_{1,1} + 1/L_{N,1}}$$

Turning now to FIG. 7, which shows one UE (UE1) in soft handover with three Node Bs (NodeB A, NodeB B, and NodeB C), and receiving scheduling from all three Node Bs as indicated by the solid arrows from UE1 to NodeB A, NodeB B, and NodeB C.

According to a first method for obtaining selection probability values when the UE is in soft handover with more than two Node Bs, the following equations can be used. Again, although not depicted for the sake of clarity, it is assumed that a second UE (UE2), similar to FIG. 4, is also in soft handover with the three Node Bs and receives scheduling from all three Node Bs.

In a 3-way handover situation among three Node Bs, for the Node Bs in soft handover, the selection probability values for UE1 and for UE2, respectively, are:

Selection probability of UE1 for Node B A, Node B B and Node B C:

$$P_{A,1} = \frac{1/L_{A,1}}{1/L_{A,1} + 1/L_{B,1} + 1/L_{C,1}},$$

$$P_{B,1} = \frac{1/L_{B,1}}{1/L_{A,1} + 1/L_{B,1} + 1/L_{C,1}}, \ P_{C,1} = \frac{1/L_{C,1}}{1/L_{A,1} + 1/L_{B,1} + 1/L_{C,1}}.$$

Selection probability of UE2 for Node B A, Node B B and Node B C:

$$P_{A,2} = \frac{1/L_{A,2}}{1/L_{A,2} + 1/L_{B,2} + 1/L_{C,2}},$$

-continued $$P_{B,2} = \frac{1/L_{B,2}}{1/L_{A,2} + 1/L_{B,2} + 1/L_{C,2}}, \quad P_{C,2} = \frac{1/L_{C,2}}{1/L_{A,2} + 1/L_{B,2} + 1/L_{C,2}}.$$

In an N-way handover situation among an N number of Node Bs, for the N Node Bs in soft handover, the selection probability values for UE1 and for UE2, respectively, are:

Selection probability of UE1:

$$P_{1,1} = \frac{1/L_{1,1}}{(1/L_{1,1} + 1/L_{2,1} + 1/L_{3,1} + \ldots + 1/L_{N,1})}$$

$$P_{2,1} = \frac{1/L_{2,1}}{(1/L_{1,1} + 1/L_{2,1} + 1/L_{3,1} + \ldots + 1/L_{N,1})}$$

$$P_{3,1} = \frac{1/L_{3,1}}{(1/L_{1,1} + 1/L_{2,1} + 1/L_{3,1} + \ldots + 1/L_{N,1})}$$

$$\ldots$$

$$P_{N,1} = \frac{1/L_{N,1}}{(1/L_{A,1} + 1/L_{B,1} + 1/L_{C,1} + \ldots + 1/L_{N,1})}$$

Selection probability of UE2:

$$P_{1,2} = \frac{1/L_{1,2}}{(1/L_{1,2} + 1/L_{2,2} + 1/L_{3,2} + \ldots + 1/L_{N,2})}$$

$$P_{2,2} = \frac{1/L_{2,2}}{(1/L_{1,2} + 1/L_{2,2} + 1/L_{3,2} + \ldots + 1/L_{N,2})}$$

$$P_{3,2} = \frac{1/L_{3,2}}{(1/L_{1,2} + 1/L_{2,2} + 1/L_{3,2} + \ldots + 1/L_{N,2})}$$

$$\ldots$$

$$P_{N,2} = \frac{1/L_{N,2}}{(1/L_{1,2} + 1/L_{2,2} + 1/L_{3,2} + \ldots + 1/L_{N,2})}$$

As can be seen from FIGS. 6 and 7, and the above examples, the present invention may be applied to various soft handover situations between various user equipment (UE) and a plurality of Node Bs.

The following Technical Documents (Tdocs) are hereby incorporated in their entirety: Tdoc R1-030794 presented during the TSG-RAN Working Group 1 #33, Aug. 25-29, 2003, in New York, N.Y., USA; Tdoc R1-031054 presented during the TSG-RAN Working Group 1 #44, Oct. 6-10, 2003 in Seoul, Korea; and Tdoc R1-031122 presented during the TSG-RAN Working Group 1 #35, Nov. 17-21, 2003 in Lison, Portugal. The information disclosed in these Tdocs is substantially reiterated below. Note the term "credit" value used above is referred to as a "weight" value in the below Tdocs.

One example of a Node B controlled scheduling method in SHO is to simply select one cell among the cells which is serving the SHO operation as a scheduling entity for that UE. This solution compared to the scheduling by multiple cells has an advantage in that a smaller amount of downlink resources are required because only one cell needs to send scheduling related information to a UE. Another advantage is that the load on Node B scheduling is decreased, because of the reduced number of UEs that have to be scheduled per cell. Further, the UE processing is reduced, because the UE only needs to decode scheduling commands from one cell. However, because the accuracy of the uplink RoT control may be insufficient because there is no coordination on the scheduling among the cells in SHO.

Figure 8:
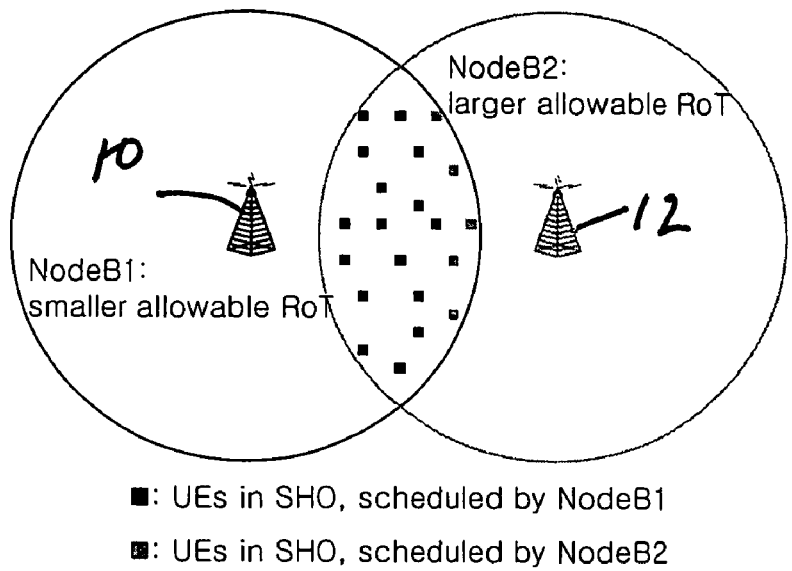
FIG. 8 is a diagram showing an example of how a Rise over Threshold (RoT) noise characteristics is used to select a scheduling Node B.

Yet another example is shown in FIG. 8, which illustrates a method in which an average allowable RoT (i.e. amount of headroom beneath a RoT threshold) is used to select a scheduling entity. Further, cells with a smaller allowable RoT include more precise RoT control to prevent RoT violation. Therefore, a cell with a smaller allowable RoT may be selected as a scheduling entity to prevent the degradation of existing uplink channels and to achieve a scheduling gain.

In this instance, and as shown in FIG. 8, a cell with a smaller allowable RoT controls more UEs than other neighbor cells so the RoT control in that cell is more precise. Note that all of the cells in SHO may decode the uplink E-DCH although only one cell schedules each UE.

Further, either of (uplink best cell+smaller allowable RoT) or (downlink best cell+smaller allowable RoT) may be used as a rule of selecting a scheduling entity among the cells in SHO.

Figure 9:
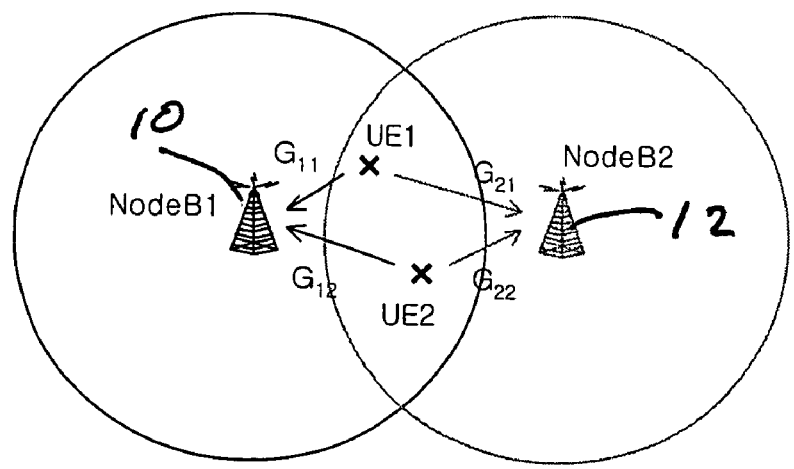
FIG. 9 is a diagram showing an example of how path-gains are used as credit values.

As discussed above, the path-gains may also be used in determining the weight gains. FIG. 9 illustrates this concept. That is, the RNC decides the scheduling weights for all UEs in a SHO state and informs the scheduling cell of those weights. Then, the scheduling cell can use the weight value in deciding the final TX power or TX rate of the UE, for example.

Further, the RNC may decide the weight values by considering relative geometry, for example, of the UE among the scheduling cell and the neighbor cells in SHO. In the example shown in FIG. 9, the UEs are in SHO with two Node Bs 10, 12, but are scheduled by only Node $B_1$ 10.

If the path-gains from the n-th UE to each Node B is $G_{1n}$ and $G_{2n}$, respectively, the SHO weight $W_n$ for the n-th UE used by Node $B_1$ can be obtained as $$W_n = \frac{G_{1n}}{G_{1n} + G_{2n}},$$

where $W_n$ value is smaller than one. Then, the Node $B_1$ 10 may schedule the UEs by multiplying each weight to the temporarily decided TX power or rate for the UEs as discussed above.

Again, in this instance, the variation of the uplink interference by the neighbor cells is reduced such that when the path gain of a UE is larger, the scheduling weight for the UE becomes smaller, and vise versa. For Node $B_{12}$, the variation of other cell interference level only from Node $B_1$ 10, which schedules the UE, is lower than that when scheduling without the weights. Thus, because the fluctuation of the RoT is decreased, a smaller RoT margin can be permitted. Therefore, the RoT in a cell can be controlled more precisely, which results in an improvement of the uplink throughput or capacity. Accordingly, more precise control on the RoT may be achievable by exploiting coordination on the scheduling among the cells in SHO.

Further, appropriate scheduling weight values per each UE are selected and the scheduled TX power/rate of most UEs in SHO is generally smaller than those of the UEs not in SHO.

Further, as previously discussed, another possible solution of Node B controlled scheduling in SHO is to let multiple cells schedule UEs in SHO. In this instance, a UE in SHO may select one of the scheduling commands from the multiple cells either in a conservative or aggressive fashion.

Alternatively, the UE may combine multiple scheduling commands from the cells in SHO with some weights given by a higher layer.

In scheduling by multiple cells, more precise control on the RoT can be achieved using the coordination among the cells in SHO. Further, the required downlink resources for L1 downlink signaling, the required UE processing, and the scheduling load on the scheduler are larger. In addition, the downlink channel qualities from the multiple cells in SHO to a UE should be set for a reliable combining at the UE side. In addition, for the UE combining scheme, appropriate combining weight values per each UE may be used to achieve a desired gain.

In addition, in the fast TFCS restriction control scheme with UP/DOWN/KEEP commands, scheduling commands from the cells may be different from each other and the scheduling cells generally do not know the result of the selection (or combining) at the UE side. Thus, the scheduling cells may know the value of the UE pointer of the UEs in SHO, resulting in possibly more scheduling difficulties. To address this problem, the UEs in SHO can report their UE pointer periodically.

In summary, in SHO, one example of Node B controlled scheduling is to select one cell in an active set as a scheduling entity for a UE. This solution has several advantages including a smaller downlink signaling load, reduced processing in the scheduler and reduced UE processing. However, the accuracy of the uplink RoT control may not be the same as compared to the multiple-cell scheduling, because there's no coordination on the scheduling among the cells in SHO.

An improvement of the RoT control accuracy can be achieved by using information obtained from coordination among the cells in SHO, even when scheduling by one cell in SHO. One example is to apply a scheduling weight to the scheduling of the UEs in SHO. In this example, the RNC decides the scheduling weight for each UE in SHO state and informs the scheduling cell of this weight. Then, the scheduling cell can use the weight values for scheduling, for example, by reflecting the weight values in the decision of the transmission power/rate or scheduling priority of each UE.

Further, the RNC may decide the scheduling weight for each UE considering, for example, the relative path-gains among the active set cells or uplink RoT statistics of the active set cells. In this way, the variation of the uplink interference by the neighbor cells can be controlled based on the RNC information and more precise control on the uplink RoT can be achieved.

Figure 10A:
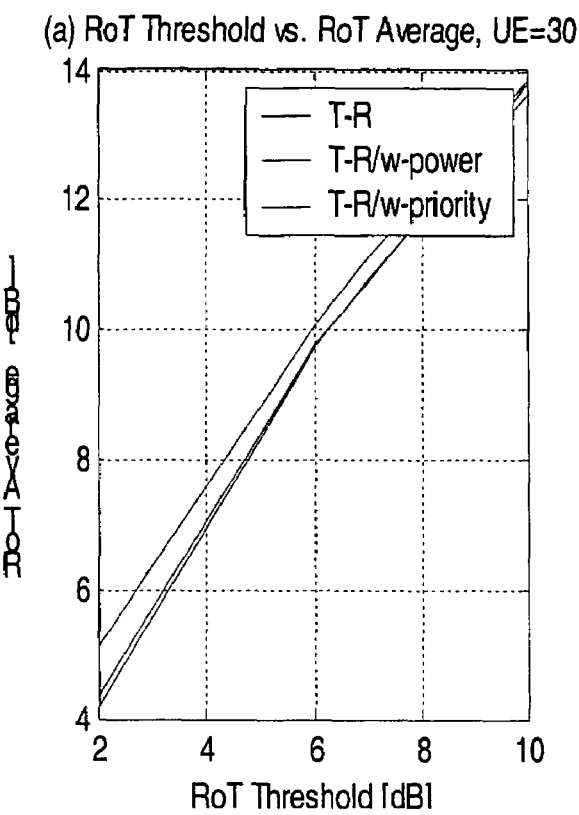
FIG. 10A is a graph showing a RoT threshold verses a RoT average for a simulation experiment performed by the present inventors.
Figure 10B:
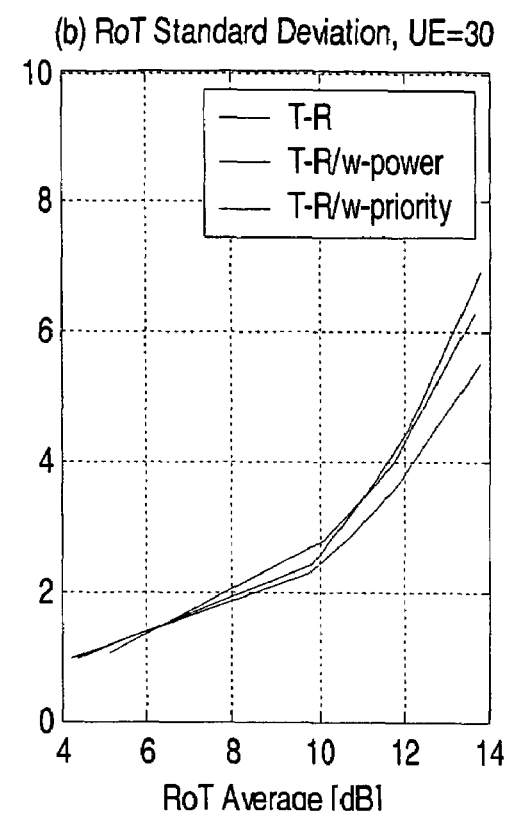
FIG. 10B is a graph showing a RoT standard deviation for the simulation experiment.

Turning next to a system simulation experiment that was performed by the inventors to investigate the gain achieved from the scheduling weight examples. FIGS. 10A and 10B illustrate results of this simulation. In the simulation, a time and rate scheduling method was used as the Node B scheduling method, and the simulation was based on the assumption of only one scheduling Node B. As shown, the time and rate scheduling (T-R) with and without scheduling weight were considered. When using the scheduling weights, two possible implementations were considered. One is to use the weight in the decision of the transmission power of each UE (T-R/w-power) and the other is to use the weight in the decision of the scheduling priority of each UE (C-R/w-priority).

The weight value for a UE in SHO was decided as a relative path-gain to the scheduling cell compared to the path-gain(s) to the non-scheduling cell(s) in the active set. That is, and as discussed above, if the path-gains from a UE to the N Node Bs in active set are $G_1, G_2, \ldots, G_N$, and $G_1$ is the path-gain to the scheduling Node B, then, the scheduling weight W is decided for that UE as $$W = \frac{G_1}{G_1 + G_2 + \ldots + G_N}.$$

The simulation shown in FIGS. 10A and 10B doesn't consider the discrete transmission rate and it was assumed the Node B scheduling assigns the transmission power to each UE. It was also assumed the UEs always transmits with an assigned power, which means a full buffer state of UE. Hence, the throughput performance is not considered, but rather only the RoT characteristic results are shown. More detailed simulation parameters are shown in Table 1.

FIGS. 10A and 10B show the standard deviation results of the uplink RoT for time and rate scheduling with/without scheduling weights. As shown, the average RoT approaches closer to the RoT threshold and the standard deviation of RoT is smaller with the scheduling weight, so that more precise uplink RoT control is achievable using scheduling weights. Further, the gain is larger with the T-R/w-priority method than with the method of T-R/w-power. In addition, note that more optimization of each scheme and the performance with the fast TFCS restriction control is F.F.S.

TABLE 1

| Simulation parameters | |
| --- | --- |
| Cell layout | 19 Node Bs with 3 sectors, wrap-around |
| Cell site distance | 1000 m |
| Channel environment | long term shawdowing only (no short-term fading) |
| E-DCH TTI and timing | 2 ms, asynchronous between UEs |
| DPDCH/DPCCH | not considered |
| UE maximum Tx power | 21 dBm |
| Background noise | −102.9 dBm |
| Number of UEs per sector | 30 |
| Active set size | maximum 3 |
| Window_add for SHO | 4 dB |
| Simulation warm up time | 3 s |
| Simulation time | 30 s |

As shown, more precise RoT control is possible using scheduling weights in SHO.

When more than one Node B control the cells present in the UE active set, there are several alternatives as to the location of the scheduling entity which controls the UE. Possible examples include:

The Node B controlling the best downlink cell (as defined by RRC for DSCH/HS-DSCH operation) is identified as the sole scheduling entity.

The Node B controlling the best uplink cell is identified as the sole scheduling entity for the UE.

All Node Bs controlling one or more cells in the UE active set are identified as valid scheduling entities. This approach requires an additional decision procedure in the UE when the UE receives the scheduling assignments from multiple Node Bs. Note that the E-DCH transmission of the UEs in soft handover may have an effect on the RoT variation of the multiple cells in the active set. If one Node B is identified as a sole scheduling entity, scheduling of a UE in SHO without consideration of non-scheduling cells in the active set can lead to an unexpected variation of the RoT in those cells. To control the RoT variation, a Node B can use information from the network, for example, a scheduling weight for each UE in soft handover.

If multiple Node Bs are identified as valid scheduling entities, a UE in a SHO region may receive different scheduling assignments from multiple Node Bs and hence UE operation upon receiving the scheduling assignments are preferably defined.

Possible UE operations include:

The UE chooses the scheduling assignment from the ones indicated by the controlling Node Bs. For example, either the best scheduling assignment or the worst one can be selected.

The UE combines the scheduling assignments from the controlling Node Bs based on a certain algorithm. For example, the UE generates a single scheduling assignment by applying a weighting factor (determined by the network) to each scheduling assignment.

Various options may be considered in terms of system performance in particular in presence of link imbalance and in terms of overall system complexity. The reliability of downlink signalling in soft handover, e.g., the scheduling assignment(s) from the controlling Node B(s), may be considered.

Further, if the Node B controlled scheduling in soft handover is not used, then one possibility would be to turn off the Node B controlled E-DCH scheduling in soft handover.

According to the present invention, by determining a parameter (e.g., a weight value, a limit value, or a selection probability) in consideration of the effects of the transmit power or transmit rate, for example, for a particular UE in soft handover with a scheduling Node B on the uplink noise rise of other neighboring Node Bs in soft handover that are not scheduling that particular UE, uplink transmission scheduling performance degradation can be prevented and more effective control of uplink noise rise at each Node B is possible.

In the above examples, the term "credit values" was primarily used. Alternatively, the term "weight values" may also be used.

The present invention can be implemented in a W-CDMA mobile communication system, for example. However, the present invention can also be applied to communication systems operating under different standards.

Further, the present invention provides a novel algorithm for efficiently performing Node B scheduling for an enhanced uplink dedicated channel (E-DCH) under soft handover conditions in a radio (wireless) mobile communication system. The present invention is also applied to the E-DCH as well as other types of similar or equivalent channels that accommodate high-speed data packet access (HSDPA) technologies for effectively transmitting packet data.

This invention may be conveniently implemented using, a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing examples and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of uplink transmission scheduling for a network including at least one radio network controller (RNC), at least one user equipment (UE), and a plurality of Node Bs, and the at least one UE being in soft handover with at least two Node Bs, the method comprising:

determining a parameter to be applied to an uplink transmission schedule of the at least one UE with at least one scheduling Node B based on an interference effect caused to neighboring Node Bs, and fowarding the parameter to one or more scheduling Node Bs, wherein the uplink transmission schedule includes a transmit power or a transmit rate to be used by the at least one UE, and the parameter comprises a credit value to be applied to the transmit power or the transmit rate of the UE, and wherein the parameter further comprises a selection probability defined as a probability for a corresponding one of the one or more scheduling Node Bs of being selected by the at least one UE to perform scheduling.

2. The method of claim 1, wherein the credit value is a ratio formed by a path-loss or path-gain between the at least one UE and the at least one scheduling Node B, and the path-loss or path-gain between the at least one UE and a non-scheduling Node B.

3. The method of claim 1, wherein at least two UEs exist in soft handover with a scheduling Node B, and a smaller credit value is applied to a transmit power or transmit rate to a UE of the at least two UEs that has the most interference effect on the neighboring Node Bs.

4. The method of claim 1, wherein the at least one UE includes at least UE1 and UE2, the path-loss for UE1 with respect to the at least two scheduling Node Bs are $L_A,1$ $L_B,1$, respectively, and the path-loss for UE2 with respect to the scheduling Node Bs are $L_A,1$ $L_B,1$, respectively, the selection probabilities ($P_A,1$ $P_B,1$) of UE1 with respect to the at least two scheduling Node Bs, and the selection probabilities ($P_A,2$, $P_B,2$) of UE2 with respect to the at least two scheduling Node Bs are defined as follows:

$$P_{A,1} = \frac{1/L_{A,1}}{1/L_{A,1} + 1/L_{B,1}}, \quad P_{B,1} = \frac{1/L_{B,1}}{1/L_{A,1} + 1/L_{B,1}}$$

$$P_{A,2} = \frac{1/L_{A,2}}{1/L_{A,2} + 1/L_{B,2}}, \quad P_{B,2} = \frac{1/L_{B,2}}{1/L_{A,2} + 1/L_{B,2}}.$$

5. The method of claim 1, wherein the at least one UE selects a corresponding one of the at least two scheduling Node Bs that has a lowest path-loss or highest path-gain with respect to the at least one UE.

6. The method of claim 1, wherein the at least one UE includes at least UE1 and UE2 in a N-way soft handover with N Node Bs with only one of the N Node Bs being a scheduling Node B, the path-losses for UE1 and UE2 with respect to the scheduling Node Bs are $L_{1,1}, L_{1,2}$, respectively, the path-losses for UE1 and UE2 with respect to a first non-scheduling Node B are $L_{2,1}, L_{2,2}$, respectively, and the path-losses for UE1 and UE2 with respect to an N non-scheduling Node B are $L_{N,1}, L_{N,2}$, for the scheduling Node B, the credit value for UE1 and for UE2, respectively, are:

$$W_1^1 = \frac{1/L_{1,1}}{(1/L_{1,1} + 1/L_{2,1} + \ldots + 1/L_{N,1})}$$

$$W_2^1 = \frac{1/L_{1,2}}{(1/L_{1,2} + 1/L_{2,2} + \ldots + 1/L_{N,2})}.$$

7. The method of claim 1, wherein the at least one UE is in a N-way soft handover with N Node Bs, only one of the N Node Bs being a scheduling Node B, the path-loss for UE1 with respect to the scheduling Node B is $L_{1,1}$, the path-loss for the UE with respect to a first non-scheduling Node B is $L_{2,1}$, the path-loss for the at least one UE with respect to a second non-scheduling Node B is $L_{3,1}$, and the path-loss for the at least one UE with respect to a N non-scheduling Node B is $L_{N,1}$, the credit values for UE1 are:

$\text{MIN}(W_{2,1}^1, W_{3,1}^1, \ldots, W_{N,1}^1)$ or $\text{MAX}(W_{2,1}^1, W_{3,1}^1, \ldots, W_{N,1}^A)$ where $W_{2,1}^1 = \frac{1/L_{1,1}}{1/L_{1,1} + 1/L_{2,1}}$, $W_{3,1}^1 = \frac{1/L_{1,1}}{1/L_{1,1} + 1/L_{3,1}}, W_{N,1}^1 = \frac{1/L_{1,1}}{1/L_{1,1} + 1/L_{N,1}}.$ 8. The method of claim 1, wherein the at least one UE includes at least UE1 and UE2, the plurality of Node Bs include N scheduling Node Bs, the path-losses for UE1 and UE2 with respect to a first scheduling Node B are $L_{1,1}, L_{1,2}$ respectively, the path-losses for UE1 and UE2 with respect to a second scheduling Node B are $L_{2,1}, L_{2,2}$ respectively, the path-losses for UE1 and UE2 with respect to an N scheduling Node B are $L_{N,1}, L_{N,2}$, the selection probability values for UE1 and for UE2, respectively, are:

Selection probability of UE1:

$$P_{1,1} = \frac{1/L_{1,1}}{(1/L_{1,1} + 1/L_{2,1} + 1/L_{3,1} + \ldots + 1/L_{N,1})}$$

$$P_{2,1} = \frac{1/L_{2,1}}{(1/L_{1,1} + 1/L_{2,1} + 1/L_{3,1} + \ldots + 1/L_{N,1})}$$

$$P_{3,1} = \frac{1/L_{3,1}}{(1/L_{1,1} + 1/L_{2,1} + 1/L_{3,1} + \ldots + 1/L_{N,1})}$$

$$P_{N,1} = \frac{1/L_{N,1}}{(1/L_{A,1} + 1/L_{B,1} + 1/L_{C,1} + \ldots + 1/L_{N,1})}$$

Selection probability of UE2:

$$P_{1,2} = \frac{1/L_{1,2}}{(1/L_{1,2} + 1/L_{2,2} + 1/L_{3,2} + \ldots + 1/L_{N,2})}$$

$$P_{2,2} = \frac{1/L_{2,2}}{(1/L_{1,2} + 1/L_{2,2} + 1/L_{3,2} + \ldots + 1/L_{N,2})}$$

$$P_{3,2} = \frac{1/L_{3,2}}{(1/L_{1,2} + 1/L_{2,2} + 1/L_{3,2} + \ldots + 1/L_{N,2})}$$

$$P_{N,2} = \frac{1/L_{N,2}}{(1/L_{1,2} + 1/L_{2,2} + 1/L_{3,2} + \ldots + 1/L_{N,2})}.$$

9. The method of claim 1, wherein the plurality of Node Bs include N Node Bs, one of the N Node Bs being a scheduling Node B and the other of the N Node Bs being non-scheduling Node Bs, and wherein path-gains of the at least one UE to the N Node Bs is G1, G2, . . . , Gn, and G1 is the path-gain to the scheduling Node B, and G2 . . . Gn are path-gains to other non-scheduling Node Bs, then the credit value for the at least one UE is defined as:

$$W = \frac{G1}{G1 + G2 \ldots Gn}.$$

10. The method of claim 1, wherein the parameter is a limit value corresponding to a maximum transmit power or transmit rate of the at least one UE.

11. The method of claim 1, the parameter comprises a scheduling priority to transmit assigned to a plurality of UEs.

12. The method of claim 11, wherein a higher scheduling priority assigned to a UE allows the higher scheduling priority UE to transmit before a lower scheduling priority UE.

13. The method of claim 1, wherein the RNC determines the parameter and forwards the parameter to a UE.

14. The method of claim 1, further comprising:

performing the uplink transmission schedule in accordance with the determined parameter.

15. The method of claim 1, wherein the plurality of Node Bs include a scheduling Node B and a non-scheduling Node B, and the at least one UE includes at least UE1 and UE1, and wherein if a path-loss of the UE1 with respect to the scheduling Node B and non-scheduling Node B is $L_{A,1}$ and $L_{B,1}$, respectively, and if a path-loss of the UE2 with respect to the scheduling Node B and non-scheduling Node B is $L_{A,2}$ and $L_{B,2}$ respectively, then the credit values WI and W2 with respect to UE1 and UE2, respectively, are defined as follows:

$$W_1 = \frac{1/L_{A,1}}{1/L_{A,1} + 1/L_{B,1}}, \quad W_2 = \frac{1/L_{A,2}}{1/L_{A,2} + 1/L_{B,2}}.$$

16. The method of claim 1, wherein the credit value is changed by the RNC whenever a change in credit value is required or requested.

17. The method of claim 1, wherein the transmit power or the transmit rate is determined by analyzing the scheduling Node B's own noise rise and/or by calculating the scheduling Node B's currently allowed noise rise amount.

18. The method of claim 17, further comprising:
informing, by the scheduling Node B, the determined transmit power or the determined transmit rate to the plurality of UEs through scheduling commands.

* * * * *